United States Patent
Popa et al.

(10) Patent No.: US 12,346,710 B2
(45) Date of Patent: Jul. 1, 2025

(54) CREATING AND EXPORTING GRAPHICAL USER INTERFACES FOR VIDEO GAME RUNTIME ENVIRONMENTS

(71) Applicant: Electronic Arts Inc., Redwood City, CA (US)

(72) Inventors: Adrian-Ciprian Popa, Bucharest (RO); Timothy J. Cowan, Orlando, FL (US); Jonathan Douglas Hayes, Orlando, FL (US)

(73) Assignee: Electronic Arts Inc., Redwood City, CA (US)

( * ) Notice: Subject to any disclaimer, the term of this patent is extended or adjusted under 35 U.S.C. 154(b) by 98 days.

(21) Appl. No.: 18/341,683

(22) Filed: Jun. 26, 2023

(65) Prior Publication Data
US 2023/0418631 A1    Dec. 28, 2023

Related U.S. Application Data

(63) Continuation of application No. 17/217,722, filed on Mar. 30, 2021, now Pat. No. 11,687,351.

(51) Int. Cl.
*G06F 9/451* (2018.01)
*A63F 13/533* (2014.01)

(52) U.S. Cl.
CPC ............ *G06F 9/451* (2018.02); *A63F 13/533* (2014.09); *A63F 2300/308* (2013.01)

(58) Field of Classification Search
None
See application file for complete search history.

(56) References Cited

U.S. PATENT DOCUMENTS

| | | | |
|---|---|---|---|
| 11,687,351 B2 | 6/2023 | Popa et al. | |
| 2004/0130564 A1* | 7/2004 | Smith | G06F 9/451 |
| | | | 715/705 |
| 2006/0215987 A1 | 9/2006 | Horentrup et al. | |
| 2010/0199227 A1* | 8/2010 | Xiao | G06F 3/0481 |
| | | | 715/863 |
| 2010/0275152 A1* | 10/2010 | Atkins | G06F 40/106 |
| | | | 715/788 |
| 2017/0168676 A1* | 6/2017 | Calder | G06V 10/56 |
| 2018/0020367 A1 | 7/2018 | Dayanandan | |
| 2018/0203674 A1* | 7/2018 | Dayanandan | G06F 8/35 |
| 2020/0319859 A1* | 10/2020 | Deora | G06F 8/34 |
| 2022/0100639 A1* | 3/2022 | Weishaar | G06F 11/3692 |
| 2023/0237054 A1* | 7/2023 | Wong | G06F 16/2425 |
| | | | 707/722 |

* cited by examiner

*Primary Examiner* — Toan H Vu
(74) *Attorney, Agent, or Firm* — Knobbe, Martens, Olson & Bear, LLP (57) ABSTRACT

Systems and methods for creating graphical user interfaces (GUIs) for runtime execution in virtual environments of software, such as video games. The system utilizes mock GUIs, which can be images illustrating or displaying mocked graphical user interfaces, to create GUIs that can be exported into runtime environments of software. The system creates GUIs by analyzing the graphical elements and attributes of mock GUIs, and assigning functionality to those graphical elements, enabling the operating of the GUIs within executable runtime environments.

20 Claims, 8 Drawing Sheets

CREATING AND EXPORTING GRAPHICAL USER INTERFACES FOR VIDEO GAME RUNTIME ENVIRONMENTS

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

In software applications, a graphical user interface (GUI) is a collection of graphical elements for, among other things, navigating through a software application, invoking functionality, and conveying information to a user.

Modern video games such as those provided under games as a service (GaaS) models continuously provide players with immersive gameplay experiences through live services. These live services create additional gameplay content that increases the number of graphical user interfaces (GUI) used in a video game. This growth in the number of graphical user interfaces makes the task of creating and testing them more difficult. As such, a system to efficiently create and export graphical user interfaces directly into video game runtime environments for testing would be advantageous.

SUMMARY

The present disclosure provides for a system for creating graphical user interfaces including one or more processors and a computer-readable storage medium including machine-readable instructions. The instructions, when executed by the one or more processors, cause the one or more processors to: (i) receive a plurality of images corresponding to a mock graphical user interface (GUI), each of the images illustrating a variation of the mock GUI; (ii) create first data identifying one or more graphical elements of the mock GUI and their respective pixel locations within the mock GUI; (iii) create second data comprising instructions corresponding to each of the graphical elements, the instructions defining one or more operative functions of the respective graphical elements; and (iv) create a GUI based on the plurality of images, the first data, and the second data. The GUI comprises machine readable instructions enabling the operation of the graphical user interface within an executable runtime environment.

The present disclosure further provides for a computer implemented method for creating graphical user interfaces. A plurality of images corresponding to a mock graphical user interface (GUI) are received. Each of the images illustrates a variation of the mock GUI. First data identifying one or more graphical elements of the mock GUI and their respective pixel locations within the mock GUI are created. Moreover, second data comprising instructions corresponding to each of the graphical elements are created. The instructions define one or more operative functions of the respective graphical elements. A GUI is created based on the plurality of images, the first data, and the second data. The GUI comprises machine readable instructions enabling the operation of the graphical user interface within an executable runtime environment.

BRIEF DESCRIPTION OF DRAWINGS

This disclosure will be more fully understood from the following detailed description taken in conjunction with the accompanying drawings, in which.

DETAILED DESCRIPTION

The systems and methods described herein solve shortcomings associated with creating and testing GUIs within a video game by providing the ability to create and export GUIs into the runtime of a video game without requiring the video game to be rebuilt or recompiled with additional code to support the GUI.

The present disclosure relates to software for creating GUIs that can be exported into the runtime of other software, such as a video game, without the need for the other software to be recompiled, or rebuilt, with additional code, or instructions, to support the exported GUI during runtime. The software for creating GUIs can create a GUI by using an image, or a set of images, that illustrate (e.g., whose contents depict or display) the design and graphical elements of a GUI. When grouped or combined, the images that illustrate the design and graphical elements of a GUI are known or referred to herein as "mock GUIs," at least or in part because they are mocks, mock-ups, models or simulations of the actual GUI to be created. The software for creating GUIs can associate functionality to the design and graphical elements of the mock GUI images to create a GUI that includes operative instructions for execution in the runtime of another software application.

Graphical elements of a GUI, or a mock GUI, are components and context that make up the interface displayed. Examples of graphical elements include, but are not limited to, gameplay menus, settings menus, heads up displays, dialogue menus, inventory menus, marketplace menus, information overlays, notifications, buttons, tiles, titles, headers, text, fonts, borders, icons, tabs, switches, timers, clocks, status indicators, notification boxes, prompts, image placements, and other graphic content of the like.

System Overview

Figure 1:
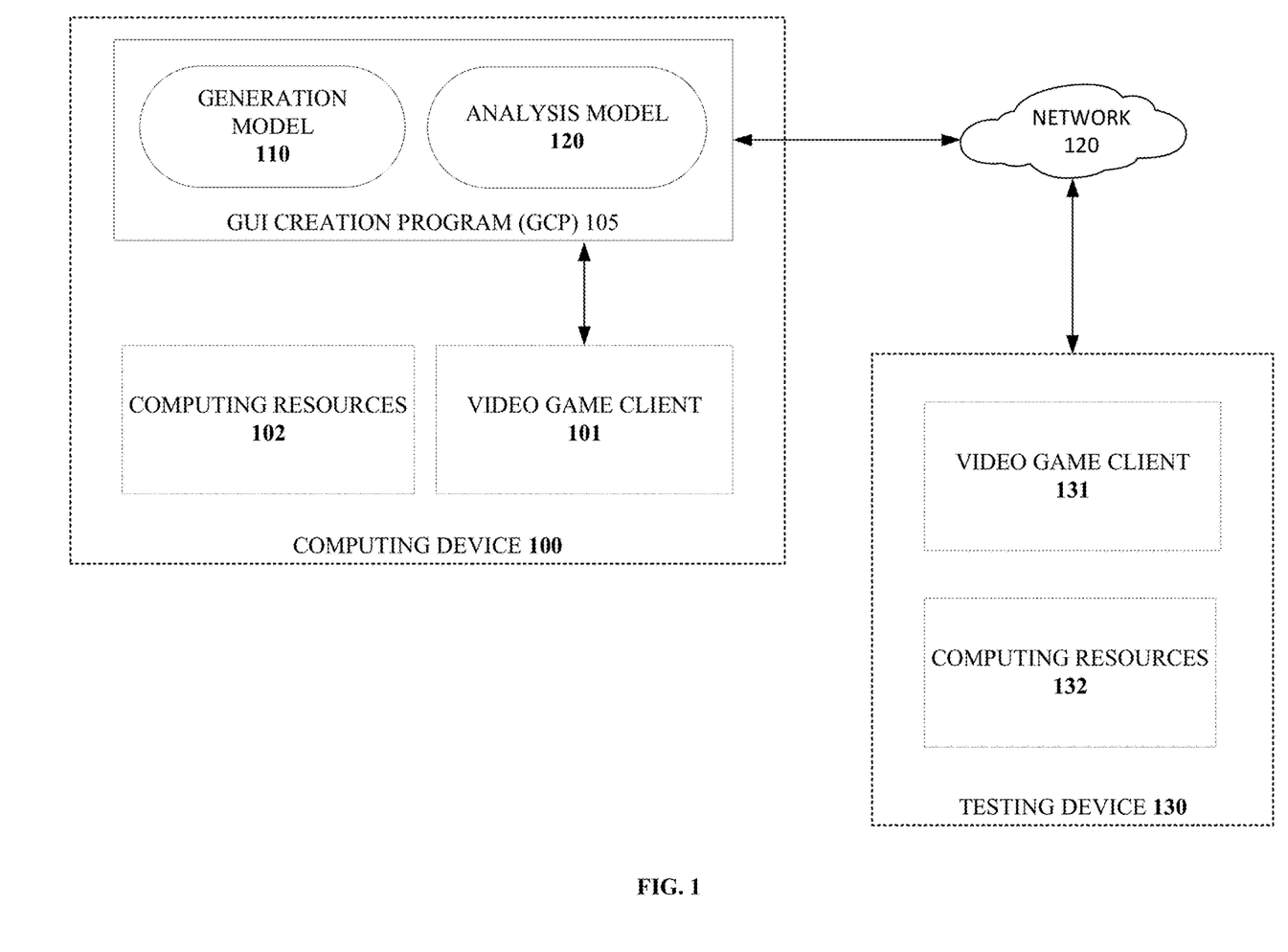
FIG. 1 illustrates an example embodiment of a system overview of a system for executing a GUI creation program.

FIG. 1 illustrates an overview of a system for creating GUIs, for example, using a graphical user interface creation program (also referred to herein as "GCP"). The system includes a computing device 100 communicatively coupled to a testing device 130 over a network 120.

Computing Device

In some embodiments, a computing device 100 utilizes computing resources 102 to execute a GCP 105. In some embodiments, the computing device 100 can also execute a local video game client 101, though it should be understood that video game client (e.g., 101) can also or additionally be executed in or by other computing devices not illustrated in FIG. 1. A testing device 130 includes computing resources 132 for executing video game client 131.

The computing device 100 can communicate with a testing device 130 over a network 120. The network 120 connecting or communicatively coupling the computing device 100 and testing device 130 can be any method of connectivity or communication between devices known in the arts, such as, but not limited to, a direct wired connection, Near Field Communication (NFC), Local Area Network (LAN), an internet connection, or other communication methods of the like.

The GCP 105 is software or a set of computer-executable code for, among other things, creating GUIs from mock GUIs. A mock GUI is an image, or set of images, that illustrate and/or can serve as the basis for a corresponding GUI that is created or is to be created. For example, a mock GUI, can be an image or set of images whose contents and design display or illustrate a GUI, in whole or in part. Another example of a mock GUI is a set of images whose contents and design display a graphical user interface, in whole or in part, such that each image in the set contains a variation of the contents and design of the graphical user interface. In other words, a mock GUI is a graphical representation of or basis for what a GUI, when implemented in a software runtime or environment, would or should look like.

In some embodiments, the GCP 105 includes a generation model 110 for creating mock GUIs and an analysis model 120 for determining attributes of mock GUIs. The mock GUIs created and analyzed by the GCP 105 can be used to create actual GUIs that can be interacted with, for instance, to input and output operations (e.g., clicks, taps, presses, etc.). A GUI created from the GCP 105 includes operative instructions, such that the GUI that is created can be exported to and executed within the runtime environment of a software application, such as a video game.

The GCP 105 can export created GUIs to a local video game client 101, or a remote video game client 132 on a testing device 130, for use during runtime. In some embodiments, the GCP 105 can export created GUIs to other software that will or may use the GUIs during runtime.

The computing resources (e.g., 102, 132) of a computing device 100 and testing device 132 include, but are not limited to, a central processing unit (CPU), a graphics processing unit (GPU), random access memory (RAM), storage devices, input and output (I/O) devices, networking devices, and other hardware components of the like. A detailed description of an example computing device and computing resources is provided below (e.g., with reference to FIG. 7).

Video Game Client

A video game client (e.g., 101, 131) is or includes software that is executable on a computer system or device and that, among other things, provides a virtual interactive environment as a runtime environment. A video game client (e.g., 101, 131) can include a library or instructions that enable it to receive and execute GUIs exported from the GCP 105. In embodiments, a video game client (e.g., 101, 131) includes instructions, designated locations, and other information for displaying and implementing the functionality of a GUI during runtime. Upon receiving and displaying a GUI, a video game client (e.g., 101, 131) can be configured to implement runtime functionality of the GUI by way of corresponding instructions provided by the GUI. In some embodiments, the GUI is an object, class, or other executable software module of the like, capable of providing instructions for runtime execution.

Graphical User Interface Creation Program (GCP)

Figure 2:
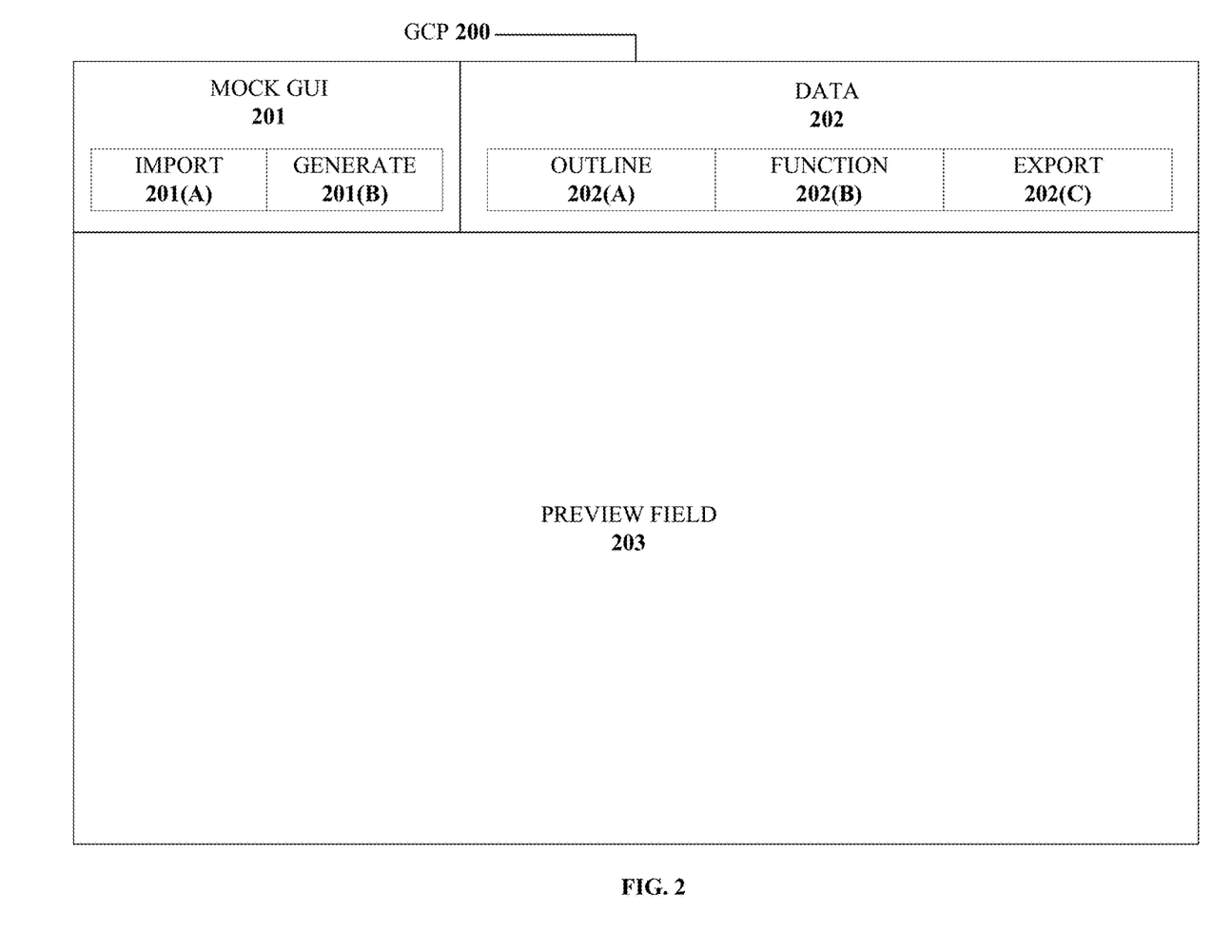
FIG. 2 illustrates an example embodiment of a user interface of a GUI creation program.

FIG. 2 illustrates an example embodiment of a user interface of a GCP 200. The GCP 200 includes a mock GUI 201, data 202, and preview field 203 section, though of course the GCP 200 can include other elements, objects and functionality not illustrated in FIG. 2.

Mock GUI Section

Figure 5A:
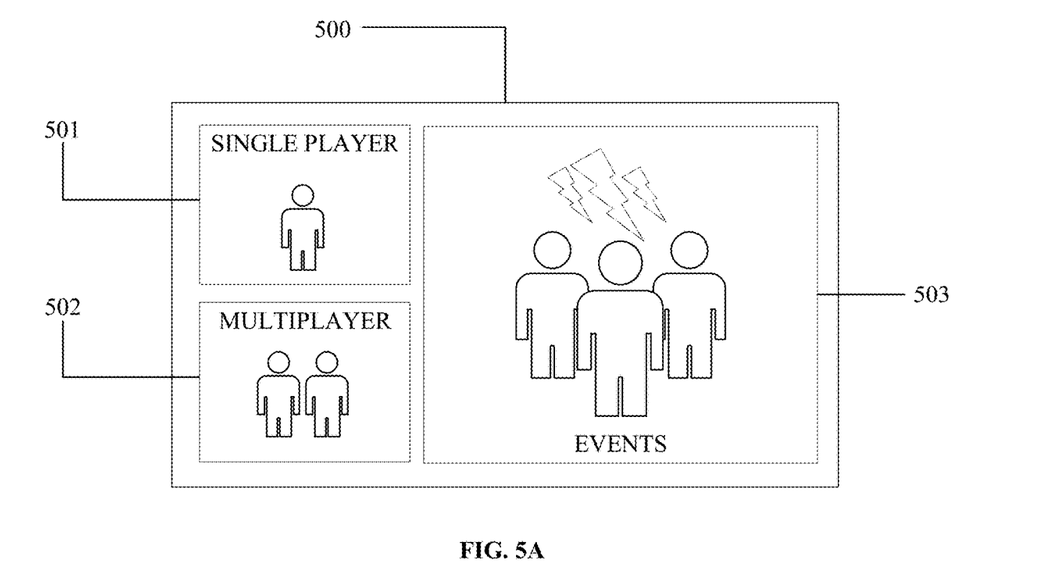
FIG. 5A illustrates a neutral state of graphical elements of an example mock GUI variation.
Figure 5B:
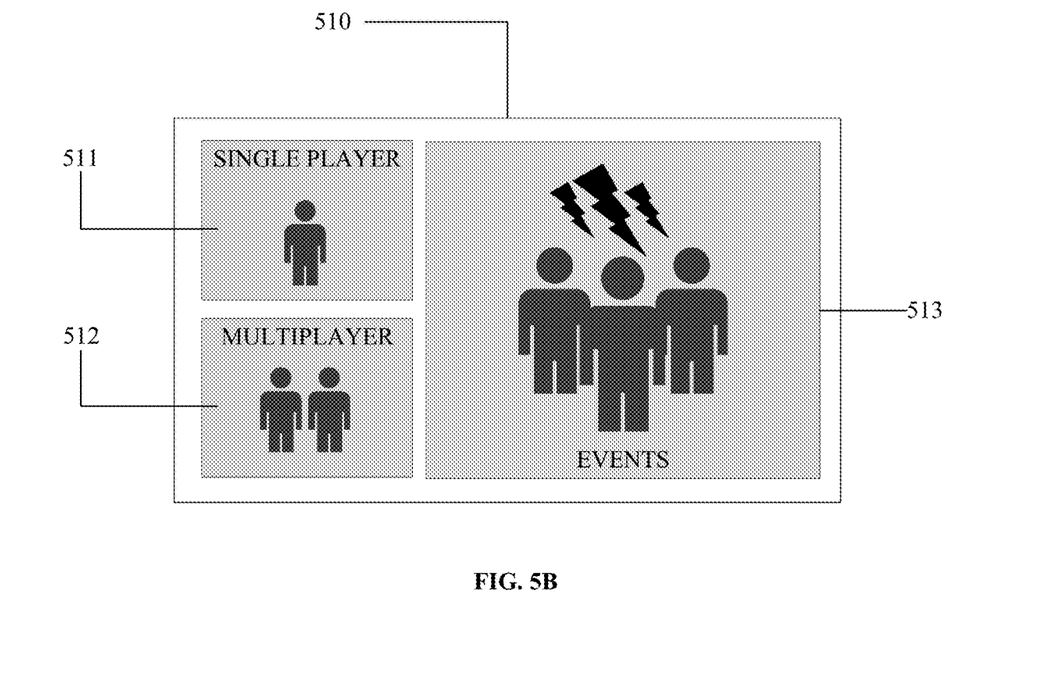
FIG. 5B illustrates a selected state of graphical elements of an example mock GUI variation.

The mock GUI 201 section of the GCP 200 includes user interface buttons to import (201(A)) and generate (201(B)) mock GUIs. The import 201(A) button, when pressed or selected, allows or causes the GCP 200 to retrieve a mock GUI. In some embodiments, a mock GUI is imported as a set of images; such that each image among the plurality of images illustrates a variation of the mock GUI. Each variation of a mock GUI illustrates or graphically represents the variable states of the graphical elements that compose or correspond to the mock GUI. For example, "neutral" state and "selected" state are common state variations of graphical elements, but other variations such as, but not limited to, "hover", "highlight", "transition", "enlarge", "reduce", "remove", or "animation" states are also contemplated herein. As such, an image set for a mock GUI includes, in some embodiments, any number of images that can illustrate the variations of the graphical elements composing the mock GUI. An example of an image set is illustrated in FIGS. 5A and 5B.

The generate 201(B) button, when pressed or selected, allows or causes the GCP 200 to generate a mock GUI. In some embodiments, a mock GUI is generated as a set of images; such that each image among the set of images illustrates a variation of the mock GUI. In some embodiments, the GCP 200 includes options to configure the generation of a mock GUI in a specified aesthetic: such as the style, layout, format, color palate, purpose, and other visual factors for GUIs of the like.

In some embodiments, the GCP 200 can provide the option to specify a variation of each image in the set. Specifying variations enables the GCP 200 to more accurately and appropriately (e.g., at the correct variation) associate corresponding functionality to each graphical element within the mock GUI. In some embodiments, specifying variations can be performed as an automated process by the GCP 200.

Data Section

The GCP 200 includes a data section 202 to create data associated with a mock GUI for creating a GUI. In some embodiments, such type of data includes the number of images included in the mock GUI, pixel locations of graphical elements in each of the mock GUI, functionality determinations and associations to the graphical elements, and operative instructions for creating and exporting a GUI to other software.

The outline button 202(A) enables the GCP 200 to create data that defines pixel locations of graphical elements within a mock GUI. In some embodiments, the preview field 203 displays an image of a mock GUI, and can accept user input for outlining pixel locations within the mock GUI that correspond to its graphical elements. In some embodiments, the generation of a mock GUI can include generating the data that defines pixel locations of, for example, graphical elements.

The data defining the pixel locations can inform the GCP 200 as to where graphical elements are located on the mock GUI (and, thereby, where they are intended to be located in the subsequently created GUI), which allows the GCP 200 to cycle through or otherwise process the variations (e.g., "images") of a mock GUI at or with reference to those defined pixel locations. Cycling through the variations of a mock GUI enables the GCP 200 to illustrate interactivity with the elements of the mock GUI, as illustrated and described in more detail below with reference to FIGS. 5A and 5B. The GCP 200 illustrates interactivity of graphical elements by overlaying the image of a variation when a graphical element is interacted with in a respective manner. The description of FIG. 6 below further illustrates this feature.

The function button 202(B) enables the GCP 200 to create data that defines the function of graphical elements in mock GUI. In some embodiments, the GCP utilizes the data defining the pixel locations of graphical elements to make the association between a function and a graphical element when defining or associating a function to a graphical element. The GCP 200 can define a variety of functions for a graphical element; such as, but not limited to, opening a new GUI, changing a configuration setting, saving a gamestate, loading data, sending data, erasing data, initiating a game mode, initiating an online connection, closing an application, and other functions of the like for video games and other applications.

The export button 202(C) enables the GCP 200 to create and export a GUI created from the mock GUI, the data outlining pixel locations of graphical elements of the mock GUI, and the data defining the functions of graphical elements of the mock GUI. In some embodiments, the GUI created is in the form of executable object code. In some embodiments, the processes of creating and exporting GUIs are implemented as separate operations for or by the GCP 200.

The user interface for the GCP 200 illustrated in FIG. 2 is provided by way of example, not limitation, as one skilled in the art should recognize the myriad of ways in which a software application could have a user interface configured.

Process

Figure 3:
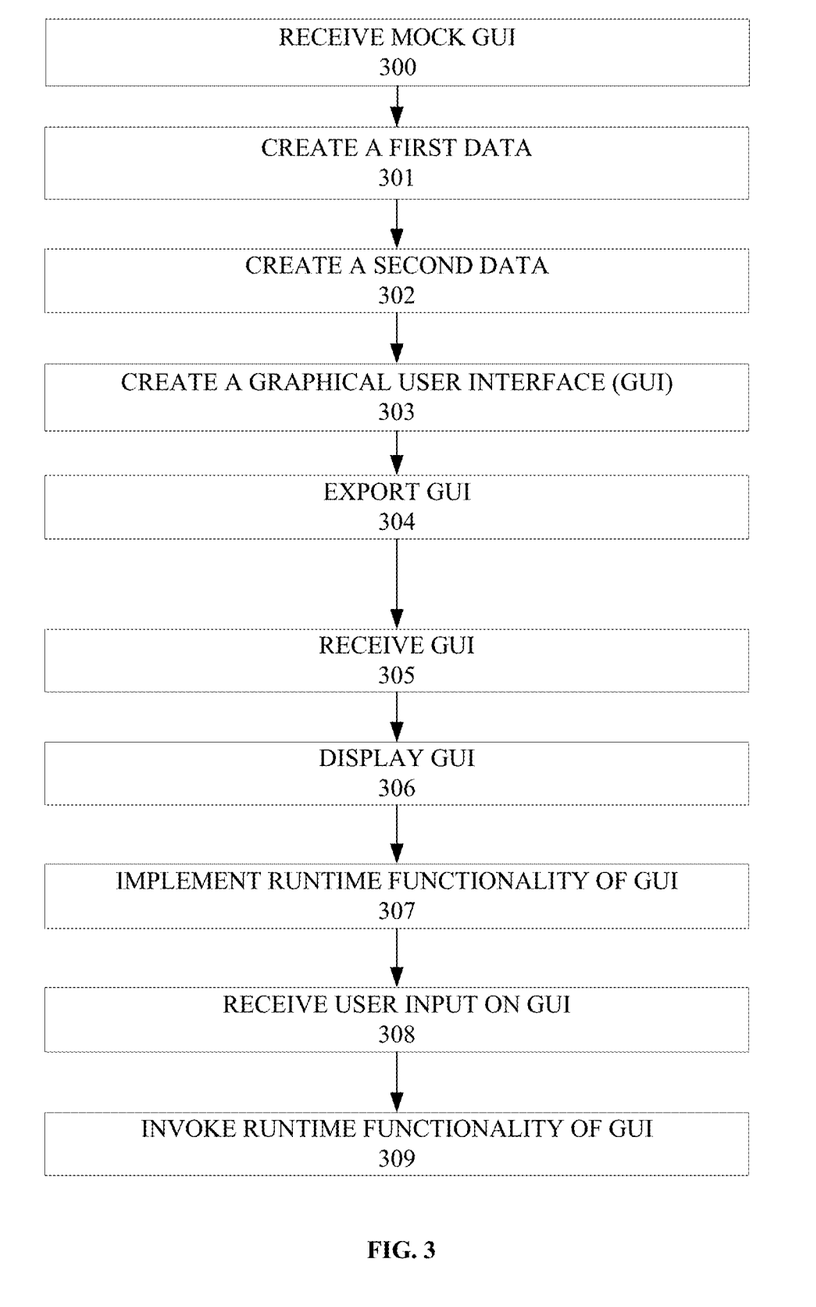
FIG. 3 illustrates an example embodiment of a GUI creation and testing process.

FIG. 3 illustrates an example embodiment of a GUI creation and testing process. In some embodiments, the process occurs over a distributed system: such as the one described for, and illustrated in, FIG. 1. In some embodiments, the process can occur over a local system.

As shown in FIG. 3, a mock GUI is received at step 300. In some embodiments, the mock GUI is received as an image set. In some embodiments, the mock GUI is received as a single image. As noted in the description of FIG. 2 above, an image set is a set of images for or corresponding to a mock GUI, and some or each of which can illustrate a variation of one or more graphical elements of the mock GUI.

In some embodiments, each image in the image set can illustrate all or portions of the mock GUI, including one or more of its graphical elements. In each image, a variation of one or more of the graphical elements of the mock GUI can be illustrated. As discussed above, a variation of a graphical element can refer to a different illustration or representation of that graphical element (e.g., relative to other variations of other images) such as when that graphical element is in a different state.

In some embodiments, an image of the image set can include one or more of the graphical elements in a certain state. For example, an image can illustrate a number of the graphical elements in their "selected" state. In some embodiments, an image can illustrate all of the graphical elements in a certain state—e.g., in their selected state.

Figure 6:
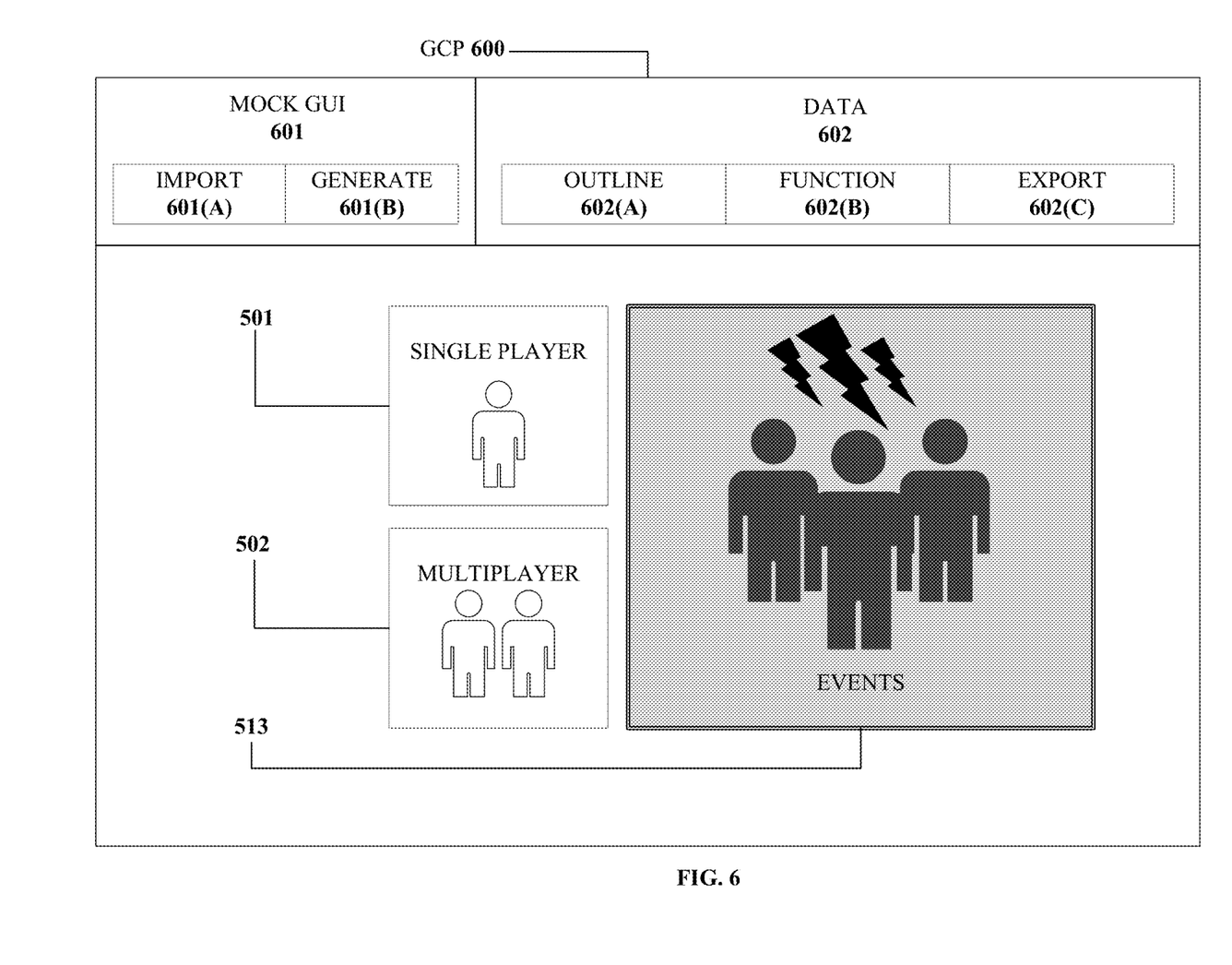
FIG. 6 illustrates an example GUI created in a GUI creation program.

In some embodiments, each image in the set of images is of the same or similar pixel size (e.g., within a threshold such as 99%, 98%, 95%, 90%, etc.), such that overlapping or transposing, a section or the entirety of one image over another among the plurality can be efficiently performed. FIG. 6, provides an example for transposing the images of an image set.

In embodiments utilizing a generative model, an image set is received through or as a result of generation of the images.

Still with reference to FIG. 3, in turn, at step 301, a first data is created based in part on the image set received at step 300. The first data that is created at step 301 can be data defining pixel locations of graphical elements within the mock GUI, as described with reference to FIG. 2.

In turn, at step 302, a second data is created based in part on the image set received at step 300. The second data created at step 302 can be data defining the functions of graphical elements, as described in the description of FIG. 2. In some embodiments, the second data can also be based in part on the first data created at step 301. In some embodiments, the creation of second data at step 302 can be based in part on attributes that are determined by an image analysis system or model.

At step 303, a GUI is created. In some embodiments, a GUI is created based in part on the image set, first data, and second data, and is created in the form of executable object code or instructions. In this way, a runtime environment configured to receive and execute the GUI is capable of testing the GUI during runtime.

In turn, the GUI created at step 303 can be exported at step 304—e.g., for testing in a runtime environment. In some embodiments, the GCP (e.g., GCP 105, 200) can perform one or more of the steps of FIG. 3, including, for example, testing the GUI.

To test a GUI, a runtime environment receives the GUI at step 305. In some embodiments, the runtime environment can receive the GUI over a network, such as a network described and illustrated in FIG. 1.

Once received, the runtime environment displays the GUI at step 306 and implements runtime functionality of the GUI at step 307. In some embodiments, a runtime environment is the virtual interactive environment of a video game and displays and implements runtime functionality of a GUI as described in FIG. 1.

Thereafter, the runtime environment receives user input on (or through, via) the GUI at step 308 to invoke runtime functionality of the GUI at step 309. User input received on a GUI executing in a runtime environment can cause the executable object code of the GUI to illustrate variations of graphical elements. That is, some user inputs may be or include interactions with graphical elements of the GUI, such that corresponding variations of the graphical elements may be invoked (e.g., "neutral", "selected", "hover", and other variations as described for example with reference to FIG. 1).

In some embodiments, the steps of creating and testing a GUI can occur in different orders. In some embodiments, the GCP of FIG. 200 can perform some or all of the steps of FIG. 3 (e.g., steps 300 through 304, testing steps of 305 through 309).

Models

Figure 4A:
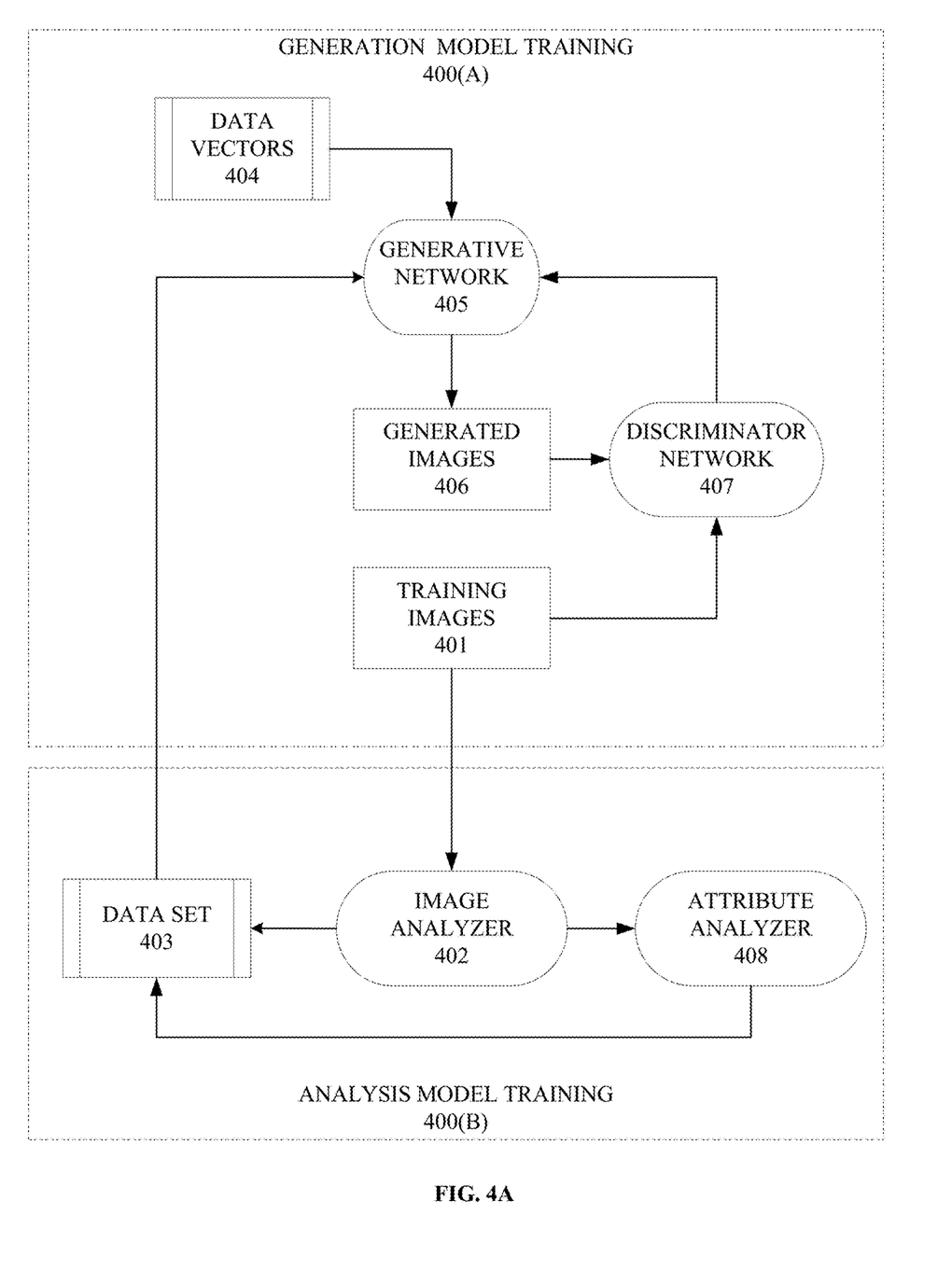
FIG. 4A illustrates an example embodiment of a training process for a generation model and analysis model.

FIG. 4A illustrates an example embodiment of a system for training a generation model (400a) and an analysis model (400b). In some embodiments, these can be two independent subsystems, or can be part of the same system.

Specifically, FIG. 4 includes a system for generation model training, namely for example a generative adversarial network (e.g., a zero sum-game machine learning network). This network can be used to generate an image set that illustrates a mock GUI. In some embodiments, the generation model training system 400(a) includes data vectors 404, a generative network 405 and a discriminator network 407.

In some embodiments, data vectors 404 are an arbitrary dataset (known in the art as "random noise" input), that are provided to the generative network 405 to create generated images 406. The generated images 406 are an image set for illustrating a GUI, and the respective variations of graphical elements of the GUI. As such, in some embodiments, generated images 406 are akin to mock GUIs. In other embodiments, the generative network 405 generates a single image illustrating a GUI (e.g., a single image mock GUI).

In some embodiments, a generative network 405 is a machine learning network for generating images. To this end, the generative network 405 is configured with an understanding of expected output (e.g., what a mock GUI should look like) by way of a data set 403 and discriminator network 407.

A data set 403 defines characteristics of training images 401. In some embodiments, training images 401 can consist of manually created mock GUIs and/or images of GUIs from an existing software application, such as a video game. The data set 403 can define characteristics such as pixel locations of graphical elements, color palettes, styling, design, layout, and purpose of the GUI illustrated, as well as the functionality of graphical elements identified. A data set 403 can provide, among other things, the generative network 405 with an understanding of expected output (e.g., how a GUI should look and function). In some embodiments, a training image 401 is analyzed by an image analyzer 402 and an attribute analyzer 408 for the creation of a data set 403.

In some embodiments, a discriminator network 407 provides feedback to a generative network 405. The feedback from the discriminator network 407 will either reinforce or correct the understanding of a generative network 405. The feedback provided by the discriminator network allows a generative network 405 to improve it's understanding during training.

Initially, a discriminator network 407 can receive training images 401 to establish a foundation of authenticity. Once an authenticity foundation is established, a discriminator evaluates the generated images 406 generated by generative network 405 until subsequent generated images 406 of a generative network 405 become indistinguishable as authentic. To illustrate, in some embodiments, the training of generative network 405 is complete when a discriminator network 407 is continuously unable to establish authenticity of received images. A discriminator network 407 outputs a value such as a value from 0 to 1; where a value of 1 indicates certainty (or a high likelihood) of authenticity, a value of 0 indicates certainty (or a high likelihood) of not authentic/inauthenticity, and a value between 0 and 1 reflects or indicates a respective degree of certainty of authenticity (or lack thereof). Therefore, when a discriminator returns a value of exactly 0.5, it is unable to distinguish whether the analyzed image is authentic or not. As such, the training phase can be deemed complete when a generative network 405 produces generated images 406 that consistently return a result of 0.5 from the discriminator network 407, since the discriminator will be unable to differentiate between generated mock GUIs and the training images 401 of real GUIs.

The analysis model training system 400(b) can be used in some embodiments for training of an image analyzer 402 and attribute analyzer 408. An image analyzer 402 is a model configured to identify graphical elements of received training images 401. The graphical elements identified by an image analyzer 402 are used in part to create a data set 403 and as input to an attribute analyzer 408. In some embodiments, the image analyzer 402 can identify pixel locations of graphical elements and text; and fonts, color palettes, icons, styling, design, layout, and purpose of the GUI illustrated. In some embodiments, the image analyzer can provide the attribute analyzer 408 with some context or data about the training images 401.

An attribute analyzer 408 identifies attributes of, or within, graphical elements identified by an image analyzer 402 to determine a, or the, functionality of the graphical elements of the training images 401. As such, an attribute analyzer 408 produces data of functional aspects of graphical elements, which can be used for the production of data set 403. A data set 403 defines the characteristics of the training images 401 supplied to image analyzer 402.

In some embodiments, the attribute analyzer 408 is provided with the training images: either directly or by the image analyzer 402. In some embodiments, the image analyzer 402 is a machine learning model, such as convolutional neural networks, configured to identify, among other things, graphical elements of GUIs. In some embodiments, the attribute analyzer 408 is a deterministic model that is configured with deterministic logic. In alternative embodiments, an attribute analyzer 408 is implemented with a machine learning model for classification.

Figure 4B:
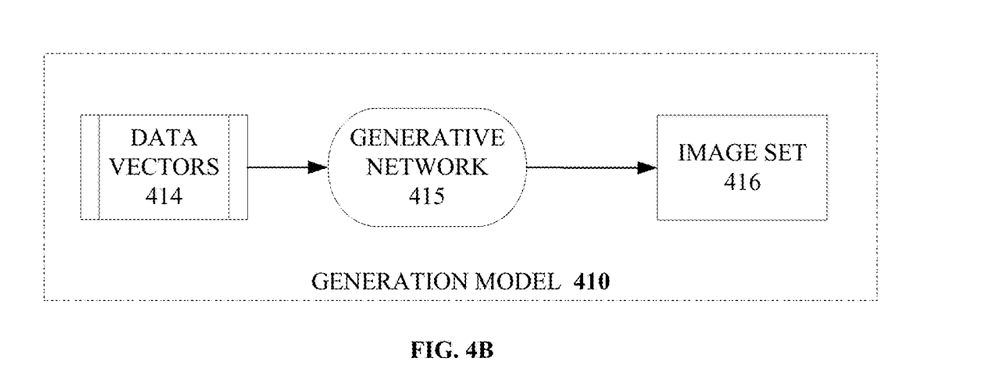
FIG. 4B illustrates an example embodiment of a trained generation model.

FIG. 4B illustrates an example embodiment of a trained generation model 410. The generation model 410 includes a trained generative network 415 that receives data vectors 414 as an input to generate an image set 416.

The data vectors 414 are an arbitrary dataset (e.g., "random noise") that are provided to a trained generative network 415. A trained generative network 415 is a generative network that has caused a respective discriminator network to be uncertain of the authenticity of the generated images produced. An image set 416 generated by a trained generative network 415 is a set of images that illustrate a mock GUI, such that each image among the plurality of the set illustrates a variation of the mock GUI, and/or where each variation of the mock GUI illustrates a different state of graphical elements of the mock GUI.

In some embodiments, a generation model 410 is incorporated into a GUI creation program; as illustrated in the system of FIG. 1. In some embodiments, a generation model 410 generates mock GUIs for a GUI creation program, as illustrated and described in FIG. 2. In some embodiments, a GUI creation program can produce a mock GUI in a specific aesthetic style and for a particular purpose. In such embodiments, the training of a generation model 410 and analysis model can be tailored for generating image set 416 and data set 423 with particular aesthetic and function, such as for the purpose of creating a "settings" GUI and/or a GUI of particular styling (e.g., such as for particular video game franchises). In these embodiments, a particular styling, aesthetic or purpose can be saved as or in association with profiles within the GCP 200, such that various profiles can exist and be utilized.

Figure 4C:
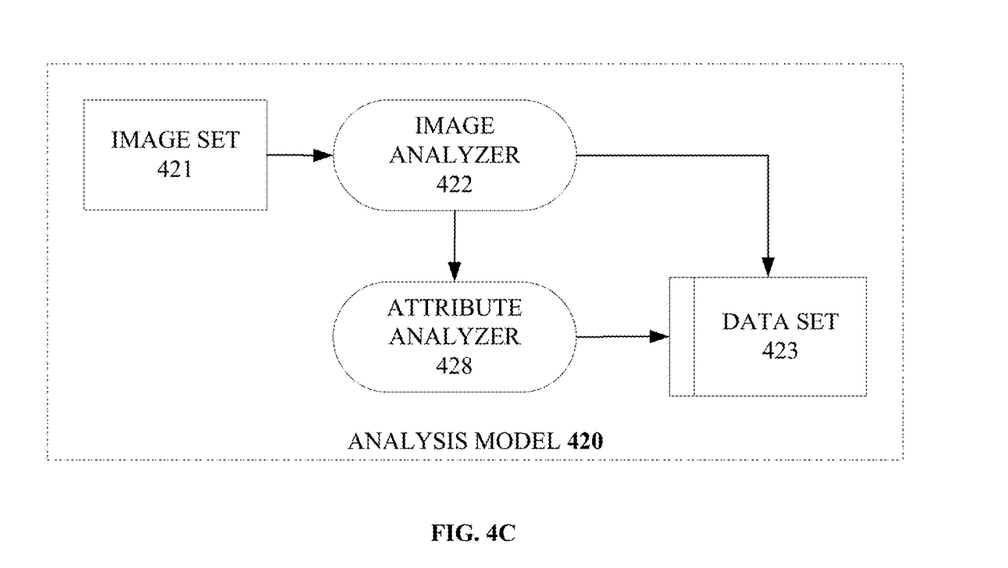
FIG. 4C illustrates an example embodiment of a trained analysis model.

FIG. 4C illustrates an example embodiment of a trained analysis model. An analysis model 420 includes a trained image analyzer 422 and trained attribute analyzer 428. In some embodiments, an image set 421 corresponds and/or illustrates a mock GUI. In some embodiments, a trained image analyzer 422 is a machine learning convolutional neural network trained to identify graphical elements of mock GUIs, as described with reference to FIG. 4A. The results of an image analyzer 422 are used to produce a data set 423. An attribute analyzer 428 analyzes graphical elements identified by an image analyzer 422 to determine functionality of the graphical elements, as described in FIG. 4A. The results of an attribute analyzer 428 are used to produce a data set 423. A data set 423 is or includes data defining characteristics of an image set 421 (e.g., of or corresponding to a mock GUI), as described with reference to FIG. 4A.

In some embodiments, an analysis model 420 is incorporated into a GUI creation program, as illustrated in and described with reference to the system of FIG. 1. An analysis model 420 utilized within a GUI creation program can be configured to produce data sets for mock GUIs. In some embodiments, an analysis model 420 creates a data set for a mock GUI that identifies the pixel locations of graphical elements based in part of the results from the image analyzer 422, thereby automating the operation of the outline 202(A) feature as shown, for example, in FIG. 2. In some embodiments, an analysis model 420 creates a data set for a mock GUI that identifies functions of graphical elements, thereby automating the operation of the function 202(B) feature of FIG. 2. In some embodiments, a GUI creation program can utilize a data set 423 created by the analysis model to incorporate functionality to a GUI created from a mock GUI.

Image Set

FIG. 5A illustrates one example variation 500 of a mock GUI in which graphical elements 501, 502 and 503 (e.g., buttons) are in a neutral state.

FIG. 5B illustrates one example variation 510 of a mock GUI (such as the mock GUI of FIG. 5A) in which graphical elements 511, 512 and 513 are in a selected state. In some embodiments, the mock GUIs illustrated in FIGS. 5A and 5B are variations of the same mock GUI in which graphical elements are in different states. That is, the graphical elements 501, 502 and 503 of FIG. 5A are the same and/or correspond to graphical elements 511, 512 and 513 of FIG. though in different states (e.g., neutral vs. selected).

In some embodiments, the variation images within an image set for a mock GUI are similar or substantially similar, but differing in the illustration of some or all of the graphical elements that are in a different state. In such embodiments, a GCP, such as GCP 200, creates a GUI based in part of an image set by overlapping or transposing the one variation of graphical element over another variation. For example, the "selected" variation can be transposed over the "neutral" variation to create the transition between the variations. In such embodiments, the transitions between one or more variations are incorporated in, or built into, a created GUI as operative instructions. In such embodiments, the transitions between the one or more variations can be viewed in the preview field of a GCP, such preview field 203 of GCP 200.

GUI Creation

FIG. 6 is an image illustrating a user interface 600 of a GCP, which as described herein can be used to create a GUI. One example embodiment of creating a GUI will now be described with reference to FIG. 6. A GUI includes graphical elements. In the example embodiment of FIG. 6, the GUI includes graphical elements 501 and 502 (e.g., corresponding to those like-numbered elements from FIG. 5A) and graphical element 513 (e.g., corresponding to that like-numbered element from FIG. 5B), solely for purposes of illustration. As such, FIG. 6. is depicted as through the images of FIG. 5A and FIG. 5B are imported as or for a mock GUI in GCP 600.

In some embodiments, items 600, 601, 601(A), 601(B), 602, 602(A), 602(B), 602(C) are akin to or correspond to items 200, 201, 201(A), 201(B), 202, 202(A), 202(B), 202(C), respectively, of FIG. 2.

The GCP 600 can be used to create a GUI from a mock GUI that contains images 500 and 510. The GCP 600 can include a preview field (e.g., preview field 203 of FIG. 2), for illustrating a preview of a GUI. In FIG. 6, a preview field includes a preview of a GUI with graphical elements 501, 502, and 513.

The outline function 602(A) (similar to the outline function 202(A) of FIG. 2) can be utilized by the GCP 600 to outline the pixel locations of graphical element 513. An outline around graphical element 513 can be defined through user input after an import 601(A) of mock GUI has occurred. In some embodiments, the outline around graphical element 513 can be performed by the GCP 600, such as by way of an analysis model, such as analysis model 420. In some embodiments, an outline t around graphical element 513 can be defined by a data set that is created when a mock GUI is created using the generate 601(B) feature of the GCP 600.

Given an outline, the GCP 600 can provide a readily available preview of how a transition between variations of a graphical element would appear in a respective preview field which is illustrated by the selected variation of graphical element 513 appearing among the neutral variations of graphical elements 501 and 502 in FIG. 6. In some embodiments, there are more than two images in an image set for a mock GUI, allowing the GCP 600 to preview and create more than two transitions between states, or variations, of the graphical elements in a GUI. In some embodiments, the types of variations may be defined explicitly by a user during the import process and/or automatically by the GCP 600 during the generation process of mock GUIs.

Computing Device

Figure 7:
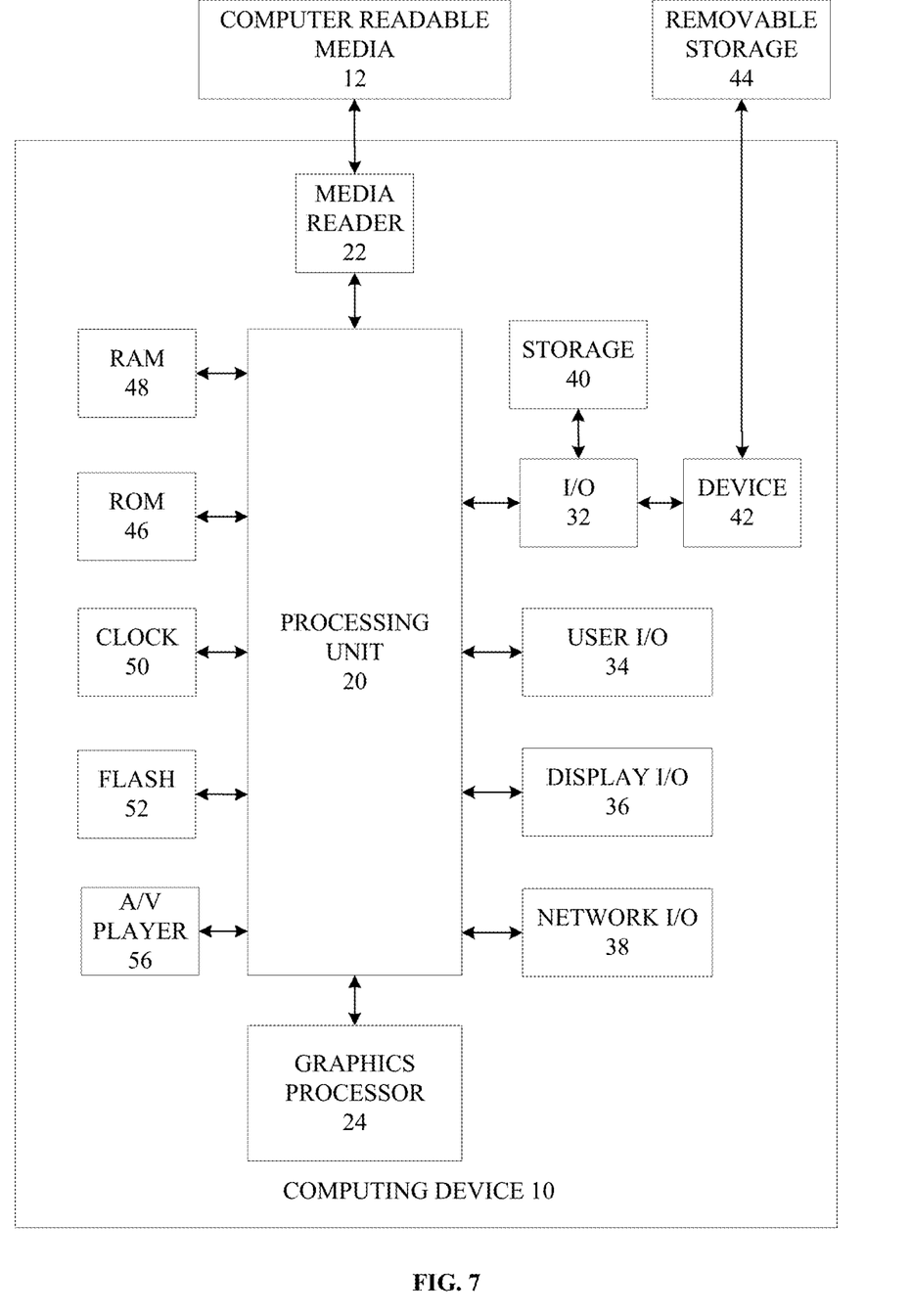
FIG. 7 illustrates an example embodiment of a computing device.

FIG. 7 illustrates an embodiment of the resources within a computing device 10. In some embodiments, computing device 100 and testing device 130, and their respective computing resources (101,131), are similar to computing device 10.

Other variations of the computing device 10 may be substituted for the examples explicitly presented herein, such as removing or adding components to the computing device 10. The computing device 10 may include a video game console, a smart phone, a tablet, a personal computer, a laptop, a smart television, a server, and the like.

As shown, the computing device 10 includes a processing unit 20 that interacts with other components of the computing device 10 and external components. A media reader 22 is included that communicates with computer readable media 12. The media reader 22 may be an optical disc reader capable of reading optical discs, such as DVDs or BDs, or any other type of reader that can receive and read data from computer readable media 12. One or more of the computing devices may be used to implement one or more of the systems disclosed herein.

Computing device 10 may include a graphics processor 24. In some embodiments, the graphics processor 24 is integrated into the processing unit 20, such that the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a video game console device, a general-purpose laptop or desktop computer, a smart phone, a tablet, a server, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data. In addition to storage 40 and removable storage media 44, computing device 10 is also shown including ROM (Read-Only Memory) 46 and RAM 48. RAM 48 may be used for data that is accessed frequently during execution of software.

User I/O 34 is used to send and receive commands between processing unit 20 and user devices, such as keyboards or game controllers. In some embodiments, the user I/O can include a touchscreen. The touchscreen can be capacitive touchscreen, a resistive touchscreen, or other type of touchscreen technology that is configured to receive user input through tactile inputs from the user. Display I/O 36 provides input/output functions that are used to display images. Network I/O 38 is used for input/output functions for a network. Network I/O 38 may be used during execution, such as when a client is connecting to a server over a network.

Display output signals produced by display I/O 36 comprising signals for displaying visual content produced by computing device 10 on a display device, such as graphics, GUIs, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

Some portions of the detailed descriptions above are presented in terms of symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The disclosed subject matter also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The disclosed subject matter may be provided as a computer program product, or software, that may include a machine-readable medium having stored thereon instructions, which may be used to program a computer system (or other electronic devices) to perform a process according to the disclosed subject matter. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

Certain example embodiments are described above to provide an overall understanding of the principles of the structure, function, manufacture and use of the devices, systems, and methods described herein. One or more examples of these embodiments are illustrated in the accompanying drawings. Those skilled in the art will understand that the descriptions herein and the accompanying drawings are intended to be illustrative, and not restrictive. Many other implementations will be apparent to those of skill in the art based upon the above description. Such modifications and variations are intended to be included within the scope of the present disclosure. The scope of the present disclosure should, therefore, be considered with reference to the claims, along with the full scope of equivalents to which such claims are entitled. The features illustrated or described in connection with one exemplary embodiment may be combined with the features of other embodiments. In some instances, well-known structures and devices are shown in block diagram form, rather than in detail, in order to avoid obscuring the disclosed subject matter.

The invention claimed is:

1. A system comprising:
one or more processors; and
a computer-readable storage medium including machine-readable instructions that, when executed by the one or more processors, cause the one or more processors to:
receive a first plurality of images corresponding to a first mock graphical user interface (GUI), each image including a plurality of graphical elements of the first mock GUI;
identify at least a first subset of graphical elements of the plurality of graphical elements within the mock GUI based at least in part on the first plurality of images;
generate a first set of instructions associated with the first subset of graphical elements based at least in part on the first plurality of images, the first set of instructions defining one or more operative functions of the respective graphical elements; and
generate a GUI based at least in part on the first plurality of images, the first subset of graphical elements, and the first set of instructions, wherein the GUI comprises machine readable instructions enabling operation of the GUI within an executable runtime environment.

2. The system of claim 1, wherein the first plurality of images of the first mock GUI are generated by a generative model, and wherein the generative model is configured to:
receive a plurality of data vectors as input; and,
manipulate the plurality of data vectors through the generative model to generate the first plurality of images of the first mock GUI.

3. The system of claim 2, wherein the generative model can be configured to generate the first plurality of images of the first mock GUI in at least one of: a specific aesthetic style, a particular purpose, or a particular functionality.

4. The system of claim 3, wherein the at least one of the specific aesthetic style, the particular purpose, or the particular functionality can be associated with a profile.

5. The system of claim 1, wherein the machine-readable instructions further configure the one or more processors to determine attributes associated with the first mock GUI.

6. The system of claim 5, wherein the attributes indicate a type and functionality of one or more of the graphical elements, wherein the functionality is associated with one or more interactive characteristics of the graphical element.

7. The system of claim 1, wherein the first GUI is configured to be executable in the runtime environment without being rebuilt or recompiled with additional machine-readable instructions.

8. The system of claim 1, wherein each of the first plurality of images illustrating one or more the graphical elements of the mock GUI in a different state.

9. A computer implemented method for creating graphical user interfaces, comprising:
receiving a first plurality of images corresponding to a first mock graphical user interface (GUI), each image including a plurality of graphical elements of the first mock GUI;
identifying at least a first subset of graphical elements of the plurality of graphical elements within the mock GUI based at least in part on the first plurality of images;
generating a first set of instructions associated with the first subset of graphical elements based at least in part on the first plurality of images, the first set of instructions defining one or more operative functions of the respective graphical elements; and
generating a GUI based at least in part on the first plurality of images, the first subset of graphical elements, and the first set of instructions, wherein the GUI comprises machine readable instructions enabling operation of the GUI within an executable runtime environment.

10. The method of claim 9, wherein the first plurality of images of the first mock GUI are generated by a generative model, and wherein the generative model creates the first plurality of images by:
receiving a plurality of data vectors as input; and,
manipulating the plurality of data vectors through the generative model to generate the first plurality of images of the first mock GUI.

11. The method of claim 10 further comprising generating the first plurality of images of the first mock GUI in at least one of: a specific aesthetic style, a particular purpose, or a particular functionality.

12. The method of claim 11, wherein the at least one of the specific aesthetic style, the particular purpose, or the particular functionality can be associated with a profile.

13. The method of claim 9 further comprising determining attributes associated with the first mock GUI.

14. The method of claim 13, wherein the attributes indicate a type and functionality of one or more of the graphical elements, wherein the functionality is associated with one or more interactive characteristics of the graphical element.

15. The method of claim 9, wherein the first GUI is configured to be executable in the runtime environment without being rebuilt or recompiled with additional machine-readable instructions.

16. A non-transitory computer readable storage medium having stored thereon instructions that, when executed by one or more processors, cause the one or more processors to:
receive a first plurality of images corresponding to a first mock graphical user interface (GUI), each image including a plurality of graphical elements of the first mock GUI;
identify at least a first subset of graphical elements of the plurality of graphical elements within the mock GUI based at least in part on the first plurality of images;
generate a first set of instructions associated with the first subset of graphical elements based at least in part on the first plurality of images, the first set of instructions defining one or more operative functions of the respective graphical elements; and
generate a GUI based at least in part on the first plurality of images, the first subset of graphical elements, and the first set of instructions, wherein the GUI comprises machine readable instructions enabling operation of the GUI within an executable runtime environment.

17. The non-transitory computer readable medium of claim 16, wherein the first plurality of images of the first mock GUI are generated by a generative model, and wherein the generative model is configured to:

receive a plurality of data vectors as input; and,
manipulate the plurality of data vectors through the generative model to generate the first plurality of images of the first mock GUI.

18. The non-transitory computer readable medium of claim 16, wherein each of the first plurality of images illustrating one or more the graphical elements of the mock GUI in a different state.

19. The non-transitory computer readable medium of claim 16, wherein the instructions further configure the one or more processors to determine attributes associated with the first mock GUI, wherein the attributes indicate a type and functionality of one or more of the graphical elements, wherein the functionality is associated with one or more interactive characteristics of the graphical element.

20. The non-transitory computer readable medium of claim 16, wherein the first GUI is configured to be executable in the runtime environment without being rebuilt or recompiled with additional machine-readable instructions.

* * * * *